United States Patent [19]
Davis et al.

[11] Patent Number: 5,902,526
[45] Date of Patent: *May 11, 1999

[54] METHOD AND APPARATUS FOR PRODUCING STRETCH BLOW MOLDED ARTICLES

[75] Inventors: Craig Davis, Atlanta; Stephen R. Lynn, Douglasville, both of Ga.

[73] Assignee: Ball Corporation, Muncie, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/831,545

[22] Filed: Apr. 8, 1997

[51] Int. Cl.$^6$ .................................................. B29C 49/78
[52] U.S. Cl. .......................................... 264/40.1; 264/532
[58] Field of Search .................................. 264/523, 537, 264/538, 541, 40.1, 532

[56] References Cited

U.S. PATENT DOCUMENTS

| | | |
|---|---|---|
| 3,934,743 | 1/1976 | McChesney et al. ........................ 215/1 |
| 3,956,441 | 5/1976 | Uhlig ....................................... 264/89 |
| 4,044,086 | 8/1977 | McChesney et al. ....................... 264/97 |
| 4,131,666 | 12/1978 | Agrawal et al. ......................... 264/521 |
| 4,151,249 | 4/1979 | Lee ......................................... 264/520 |
| 4,170,622 | 10/1979 | Uhlig ..................................... 264/520 |
| 4,287,150 | 9/1981 | Gendron ................................. 264/523 |
| 4,307,137 | 12/1981 | Ota et al. ................................ 428/35 |
| 4,320,083 | 3/1982 | Jakobsen ................................. 264/531 |
| 4,323,341 | 4/1982 | Valyi ...................................... 425/526 |
| 4,359,165 | 11/1982 | Jakobsen ................................. 215/1 |
| 4,564,497 | 1/1986 | Ota ........................................ 264/521 |
| 4,587,075 | 5/1986 | Butcher et al. .......................... 264/573 |
| 4,785,950 | 11/1988 | Miller et al. ............................. 215/1 |
| 4,927,679 | 5/1990 | Beck ...................................... 264/532 |
| 4,997,692 | 3/1991 | Yoshino ................................ 428/36.92 |
| 5,057,267 | 10/1991 | Seizert et al. ........................... 264/541 |
| 5,101,990 | 4/1992 | Krishnakumar et al. ................... 215/1 |
| 5,102,588 | 4/1992 | Feuerherm ............................... 264/541 |
| 5,116,565 | 5/1992 | Yoshino ................................. 264/532 |
| 5,312,572 | 5/1994 | Horwege ................................. 264/25 |
| 5,443,868 | 8/1995 | Oda et al. ............................... 428/35.7 |

*Primary Examiner*—Catherine Timm
*Attorney, Agent, or Firm*—Locke Reynolds

[57] ABSTRACT

A non-destructive, direct method and apparatus for producing stretch blow molded articles having at least one physical dimension within a preselected range. The apparatus includes an injection mold defining an injection mold interior surface having a first differentially dimensioned portion disposed at a preselected location thereon and capable of producing a parison having a parison exterior surface including a first marker formed by contact with the first differentially dimensioned portion, and a stretch blow mold defining a stretch blow mold interior surface having a second differentially dimensioned portion disposed at a predetermined location thereon and capable of producing the article from the parison including a second marker formed by contact with the second differentially dimensioned portion. Relative position of the first marker with respect to the second marker indicates whether a dimension is within a preselected range. The method includes injection molding a parison so that a parison exterior surface includes a first marker disposed at a preselected position thereon and formed by contact with a first differentially dimensioned portion disposed at a preselected location on an injection mold interior surface, and stretch blow molding an article from the parison so that an article exterior surface includes a second marker disposed at a predetermined position thereon and formed by contact with a second differentially dimensioned portion disposed at a predetermined location on a stretch blow mold interior surface.

24 Claims, 11 Drawing Sheets

METHOD AND APPARATUS FOR PRODUCING STRETCH BLOW MOLDED ARTICLES

BACKGROUND OF THE INVENTION

1. Field of the Invention

The present invention generally relates to the field of articles that are blow molded from parisons, and more particularly concerns methods and apparatus for producing stretch blow molded articles formed of polymeric resin and having consistent physical dimensions.

2. Description of the Prior Art

Providing consistent physical dimensions, including consistent material distribution, has been a chronic problem in production of stretch blow molded articles, such as those articles formed from polymeric resins. Difficulties in achieving consistent physical dimensions such as material distribution has led to problems in assuring acceptably high quality of such articles. In addition, difficulties with physical dimensions such as material distribution may exist across various production platforms and between production facilities seeking to produce substantially identical stretch blow molded articles. Consistent physical dimensions such as material distribution are very important for end performance characteristics of stretch blow molded articles such as burst strength, deformation, and stress cracking.

Current material distribution analysis techniques directed to already formed stretch blow molded articles are time consuming, relatively crude in that such techniques provide only gross material distributions, and, in addition, do not lend themselves to automated inspection. One current analysis technique for material distribution is the so-called section weighing method, where, for instance, portions of a stretch blow molded article such as a base, label panel, and shoulder, are cut away from each other and individually weighed to ascertain whether these sections weigh within prescribe tolerances. Despite the availability of the section weighing method, and while this method is adequate for gross, overall material distribution of the sections, the section weighing method cannot account for variability within the section, although variability within a section of a stretch blow molded article has been frequently observed in both laboratory and production environments. Further, the section weighing method is necessarily destructive of the article. Therefore, such method may only be used to indirectly determine whether the material distribution of a stretch blow molded article which has not been cut and weighed but was made using the production parameters of a section weighed article is within acceptable tolerances.

Consequently, there exists a need in the art for a method and apparatus for directly and non-destructively assuring consistent physical dimensions such as material distribution for stretch blow molded articles, in order to produce stretch blow molded articles of consistent quality across various production platforms and between different production facilities.

SUMMARY OF THE INVENTION

In order to aid in the understanding of the present invention, it can be stated in essentially summary form that it is directed to a non-destructive, direct method and apparatus for the production of stretch blow molded articles having well-controlled physical dimensions, such as dimensions indicating material distribution, thereby providing consistent quality control across platforms and production facilities, so that optimum articles are produced consistently. The method and apparatus of the present invention ensures consistent and controlled physical dimensions for stretch blow molded articles, providing an accuracy level for physical dimensions and resultant quality of stretch blow molded articles that far exceeds that available from current methods and apparatus.

More specifically, the apparatus for producing a stretch blow molded article having at least one dimension within a preselected range of the present invention includes a polymeric resin injection mold having a core and a cavity which can be defined by at least a pair of mold splits defining a generally smooth injection mold interior surface, and may have at least a pair of thread splits for forming a threaded finish. Clamping members may be provided to maintain the core and the cavity defining members in relative position. Defined on the injection mold interior surface are a plurality of first differentially dimensioned portions, with each first differentially dimensioned portion disposed at a preselected location thereon. Further, a plurality of cooling passages may be provided within the injection mold for more rapid cooling of molten polymeric resin injected therein. By injection of molten polymeric resin through a gate into a cavity formed between the core and the injection mold interior surface, the injection mold may produce a parison. A parison exterior surface defined by the parison includes a plurality of first markers, each formed by contact with one of first differentially dimensioned portions, whereby each first marker is formed at a preselected position on the parison exterior surface.

The first differentially dimensioned portions may be light circumferential lines, disposed generally planarly and parallel to each other, each forming a complete annulus on the injection mold interior surface. The first differentially dimensioned portions may also be disposed on the injection mold interior surface in any of a variety of configurations and orientations, such as where individual first differentially dimensioned portions are formed of small or large differentially dimensioned segments disposed planarly or non-planarly, or such as incomplete and/or non-parallel annuli, or formed by raised or depressed impressions on the injection mold interior surface, or by modified surface finish of the injection mold interior surface.

The apparatus of the present invention further includes a stretch blow mold having stretch blow mold sections defining a generally smooth stretch blow mold interior surface having a plurality of second differentially dimensioned portions, with each second differentially dimensioned portion disposed at a predetermined location on stretch blow mold interior surface. The stretch blow mold is capable of producing an article from the parison by stretching and blowing the parison to form the article as defined by the stretch blow mold interior surface. During stretching and blowing, the dimensions of the first markers may change in absolute terms, but remain present on an article exterior surface defined by the article after stretching and blowing of the parison to form the article. In stretch blow molding, the article exterior surface is formed to include a plurality of second markers formed by contact with the second differentially dimensioned portions. The shape and location of each second differentially dimensioned portion may be selected to correspond with the optimum shape and location of one of the first markers, the first markers disposed on the article exterior surface as the article is stretch blown from the parison. In this way, each of the second markers is disposed at a predetermined position on the article exterior surface, and corresponds with and is proximate to one of the first markers.

Second differentially dimensioned portions may form a complete annulus on stretch blow mold interior surface. However second differentially dimensioned portions may be disposed on the stretch blow mold interior surface in any of a variety of configurations and orientations, such as where the individual second differentially dimensioned portions are formed of small or large differentially dimensioned segments disposed planarly or non-planarly, or such as incomplete annuli. Further, the second differentially dimensioned portions may be formed by raised or depressed impressions on the stretch blow mold interior surface, or by modified surface finish of stretch blow mold interior surface.

In a finished article, the relative position of first markers with respect to a corresponding, proximately disposed second markers indicates whether at least one dimension is within the preselected range. For example, the thickness dimension of a profile of the article may be determined to be within a preselected range of thicknesses by ascertaining whether the distance between each first marker and a corresponding second marker is less than a preselected distance.

In a second embodiment of the apparatus of the present invention, the injection mold includes at least one first differentially dimensioned portion having a first raised portion. Due to the presence of first raised portion, the injection mold is capable of producing the parison with at least one first marker including a first indented portion formed by contact of molten polymeric resin with the first raised portion during formation of the parison.

In a third embodiment of the apparatus of the present invention, the injection mold includes at least one first differentially dimensioned portion having a second indented portion. As a result of the presence of the second indented portion, the injection mold is capable of producing the parison with at least one first marker including a second raised portion formed by contact of molten polymeric resin with the second indented portion during formation of the parison.

In a fourth embodiment of the apparatus of the present invention, the stretch blow mold includes at least one second differentially dimensioned portion having a tolerance band. The stretch blow mold is thus capable of stretching and blowing the parison to produce an article having at least one second marker including a tolerance zone formed by contact with the tolerance band, to produce a finished stretch blow molded article including a plurality of first markers and a plurality of corresponding tolerance zones. The relative position of the first markers with respect to corresponding, proximate tolerance zones indicates whether at least one dimension is within a preselected range. Where the first markers lie within corresponding tolerance zones, the at least one dimension will be within a preselected range. However, if a first marker lies outside the corresponding tolerance, then the at least one dimension is not within a preselected range.

Inspection of the articles to determine whether the first markers are in acceptably close proximity to the corresponding second markers, or to determine whether the first markers lie within the corresponding tolerance zones can be done visually, by machine vision, or using other automated inspection procedures. For example, an inspection means capable of inspecting an article to determine whether the first markers lie within the corresponding tolerance zones may include any of a number of available elements capable of automatic inspection, for instance, a plurality of sensors capable of sensing light transmitted through or reflected from the article proximate to the first markers and the tolerance zones, with each sensor capable of changing states upon receiving such transmitted or reflected light showing that the first markers do not lie within one of the tolerance zones.

In a fifth embodiment of the apparatus of the present invention, the stretch blow mold includes at least one second differentially dimensioned portion including a first elevated portion, so that the stretch blow mold is capable of producing an article with at least one second marker including a first depressed portion formed by contact with the first elevated portion as the parison is blown into the article. The parison may be produced with a first marker including a first indented portion formed by contact with a first raised portion of the injection mold. In this way, the relative position of the first indented portion with respect to the first depressed portion may be determined, indicating whether at least one dimension is within a preselected range.

In a sixth embodiment of the apparatus of the present invention, the stretch blow mold includes at least one second differentially dimensioned portion including a second depressed portion, whereby the stretch blow mold is capable of producing the article with at least one second marker including a second elevated portion formed by contact with the second depressed portion. The parison may be produced with a first marker including a second raised portion formed by contact with a second indented portion of the injection mold, so that relative position of the second raised portion with respect to the second elevated portion is capable of indicating whether at least one dimension is within a preselected range.

In a seventh embodiment of the apparatus of the present invention, the stretch blow mold includes at least one second differentially dimensioned portion including the first elevated portion, so that the stretch blow mold is capable of producing the article with at least one second marker including a first depressed portion formed by contact with the first elevated portion. The parison may be produced with a first marker including a second raised portion formed by contact with a second indented portion of the injection mold, with relative position of the second raised portion with respect to the first depressed portion capable of indicating whether at least one dimension is within a preselected range.

In an eighth embodiment of the apparatus of the present invention, the stretch blow mold includes at least one second differentially dimensioned portion including a second depressed portion, with the stretch blow mold capable of producing the article with at least one second marker including a second elevated portion formed by contact with the second depressed portion as the parison is blown. The parison may be produced with a first marker including a first indented portion formed by contact with a first raised portion of the injection mold. In this way, relative position of the first indented portion with respect to the second elevated portion may be determined, indicating whether at least one dimension is within a preselected range.

Locations of the second differentially dimensioned portions on the stretch blow mold interior surface are determined during the preproduction phase of article development, where at least one optimum dimension of the article, for example, optimum thickness distribution, is ascertained and a set of optimum production parameters for stretch blow molding the parisons to form the articles to achieve such at least one dimension are recorded. A plurality of marker lines are made along the parison exterior surface in the form of light, circumferential scores, and the parison is then stretch blown to form the article using the set of optimum parameters previously determined. As the parison is stretch blown by the stretch blow mold, the parison exterior surface is stretched and distorted, and the marker lines are also stretched and distorted. The marker lines are present on the article exterior surface after stretch blow molding. The marker lines are tracked to their locations on article exterior surface, thereby providing a mapping between the marker lines on the parison exterior surface and optimum locations of the marker lines on the article exterior surface, after the marker lines are stretched and distorted from stretch blow molding of the parison. The optimum locations of the stretched, distorted marker lines on the article exterior surface may then be used to determine desired locations of second differentially dimensioned portions on the stretch blow mold interior surface that would produce second markers on the article exterior surface corresponding with, overlying and matching the optimum locations of the stretched, distorted marker lines on the article exterior surface.

Locations of the tolerance bands on the stretch blow mold interior surface may be determined by introducing a small variation or perturbation from the at least one dimension of the article, for example, optimum thickness distribution, by slightly varying or detuning the set of optimum production parameters for stretch blow molding a parison having the marker lines disposed at the optimum locations on the parison exterior surface. An article stretch blow molded using parameters slightly detuned from optimum will have marker lines stretched and distorted to locations on the article exterior surface that are slightly different from the locations of marker lines on the article exterior surface resulting from stretch blow molding using the optimum set of parameters. By repeating this procedure, each time slightly varying different production parameters, allowable tolerances for the at least one dimension of the article may be tracked to a plurality of acceptable locations for each stretched and distorted first marker on the article exterior surface. The set of acceptable locations of each stretched and distorted first marker on the article exterior surface defines a range of acceptable tolerance reflecting preferred, allowable values of the at least one dimension for the article. The ranges of acceptable tolerance may be mapped to the stretch blow mold interior surface to define, for each second differentially dimensioned portion, a tolerance band located to correspond with each range of acceptable tolerance and capable of producing second markers on the article exterior surface including tolerance zones matching the ranges of acceptable tolerance.

On production injection molds, the injection mold interior surface is formed to have first differential dimensioned portions capable of producing parisons including first markers in the same locations as the marker lines scribed on the parison exterior surface during the preproduction phase. On production stretch blow molds, the stretch blow mold interior surface is formed to have second differentially dimensioned portions capable of producing articles including second markers on the article exterior surface corresponding to the optimum locations of the stretched, distorted first markers.

The present invention thus provides for the production of stretch blow molded articles with non-destructively and directly controlled dimensions, such as material thickness distribution throughout the profile of stretch blow molded articles, and for consistent quality control across platforms and production facilities, ensuring that an optimum article is consistently produced with desirable performance characteristics such as burst strength, deformation, and stress cracking.

The method of the present invention for producing a stretch blow molded article having at least one dimension within a preselected range includes the step of injection molding the parison so that a parison exterior surface includes at least one first marker, each first marker disposed at a preselected position on the parison exterior surface and formed by contact with a first differentially dimensioned portion disposed at a preselected location on a generally smooth injection mold interior surface defined by the injection mold. Further, the method of the present invention includes the step of stretch blow molding an article from the parison so that an article exterior surface includes at least one second marker, each second marker disposed at a predetermined position on the article exterior surface and formed by contact with a second differentially dimensioned portion disposed at a predetermined location on a generally smooth stretch blow mold interior surface defined by the stretch blow mold, with the relative position of the first markers with respect to the second markers indicating whether at least one dimension is within a preselected range.

The method of the present invention may also include stretch blow molding the article so that at least one second marker includes a tolerance zone formed by contact with a tolerance band defined by a second differentially dimensioned portion, with relative position of a first marker within the tolerance zone indicating that the at least one dimension is within a preselected range. In addition, the method of the present invention may also include inspecting an article to determine whether a first marker is positioned within the tolerance zone.

Further, in the method of the present invention, the parison may be injection molded so that a first marker includes a first indented portion formed by contact with a first raised portion defined by a first differentially dimensioned portion. In addition, the article may be stretch blow molded so that a second marker includes a first depressed portion formed by contact with a first elevated portion defined by a second differentially dimensioned portion, with relative position of the first indented portion with respect to the first depressed portion indicating whether the at least one dimension is within a preselected range.

Additionally, the method of the present invention may include injection molding the parison so that a first marker includes a second raised portion formed by contact with a second indented portion defined by a first differentially dimensioned portion, and stretch blow molding the article so that a second marker includes a second elevated portion formed by contact with a second depressed portion defined by a second differentially dimensioned portion, so that relative position of the second raised portion with respect to the second elevated portion indicates whether the at least one dimension is within a preselected range.

The method of the present invention may also include injection molding the parison so that a first marker includes a second raised portion formed by contact with a second indented portion defined by a first differentially dimensioned portion and stretch blow molding the article so that a second marker includes a first depressed portion formed by contact with a first elevated portion defined by a second differentially dimensioned portion whereby relative position of the second raised portion with respect to the first depressed portion indicates whether the at least one dimension is within a preselected range.

Similarly, in the method of the present invention, the parison may be injection molded so that a first marker includes a first indented portion formed by contact with a first raised portion defined by a first differentially dimensioned portion. In addition, the article may be stretch blow molded so that a second marker includes a second elevated portion formed by contact with a second depressed portion defined by a second differentially dimensioned portion, whereby relative position of the first indented portion with respect to the second elevated portion indicates whether the at least one dimension is within a preselected range.

It is an object of the present invention to provide an apparatus for producing a stretch blow molded article having at least one consistent and controlled dimension.

It is another object of the present invention to provide an apparatus for producing a stretch blow molded article having at least one consistent and controlled dimension, utilizing direct, non-destructive analysis of the stretch blow molded article.

It is yet another object of the present invention to provide a method for producing a stretch blow molded article having at least one consistent and controlled dimension.

It is yet another object of the present invention to provide a method for producing a stretch blow molded article having at least one consistent and controlled dimension, utilizing direct, non-destructive analysis of the stretch blow molded article.

It is yet another object of the present invention to provide a stretch blow molded article having at least one dimension within a preselected range.

It is still another object of the present invention to provide a stretch blow molded article having at least one dimension within a preselected range, determinable by direct, non-destructive analysis of the stretch blow molded article.

Further objects and advantages of the present invention will be apparent from a study of the following portion of the specification, the claims, and the attached drawings.

DETAILED DESCRIPTION OF THE PREFERRED EMBODIMENTS

The following portion of the specification, taken in conjunction with the drawings, sets forth the preferred embodiments of the present invention. The embodiments of the invention disclosed herein are the best modes contemplated for carrying out the invention in a commercial environment, although it should be understood that various modifications can be accomplished within the parameters of the present invention.

Figure 1:
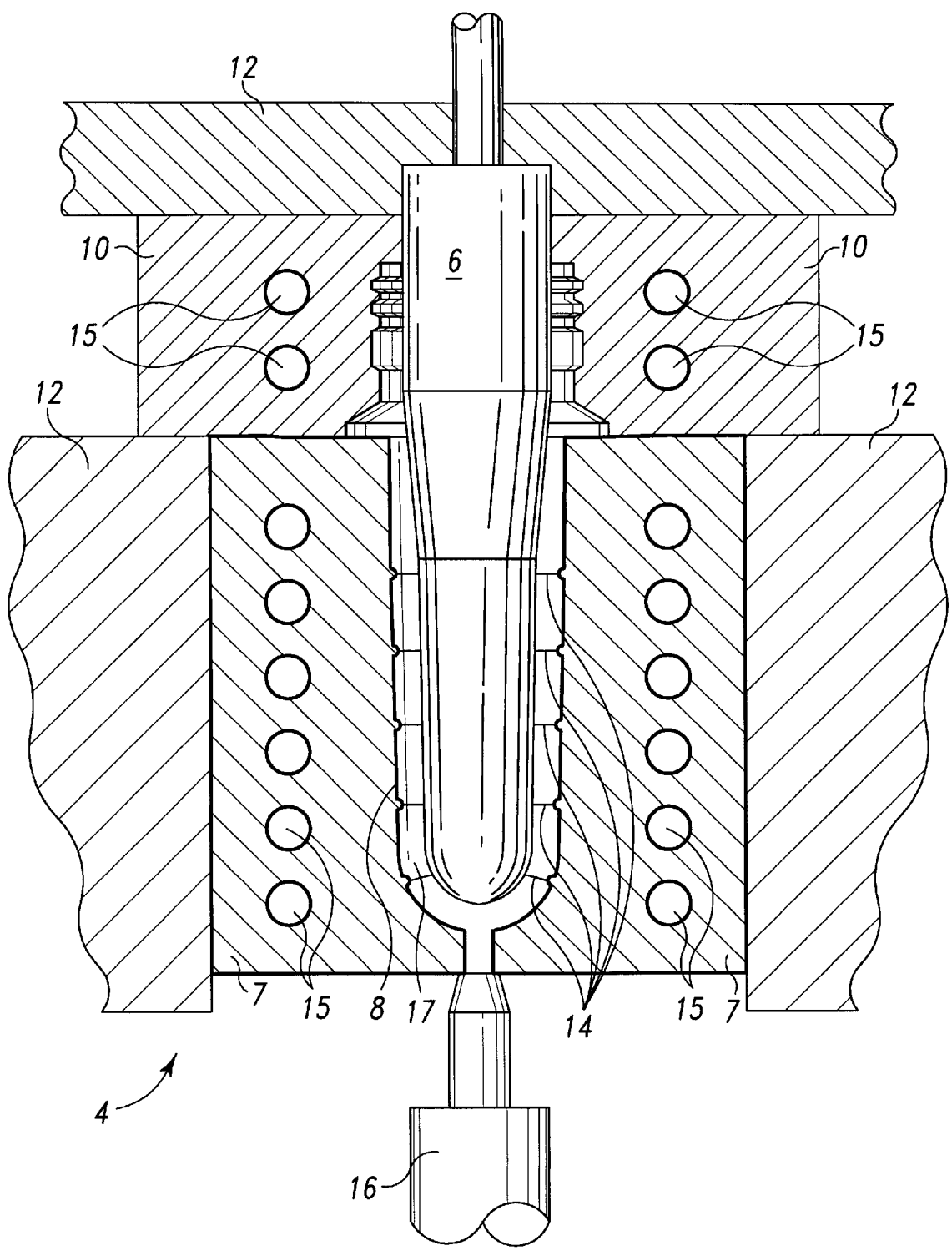
FIG. 1 is a sectional view of an injection mold of an apparatus for producing a stretch blow molded article having at least one dimension within a preselected range representing the present invention.

Referring now to the drawings for a detailed description of the apparatus of the present invention, reference is first made to FIG. 1 generally depicting polymeric resin injection mold 4 of an apparatus for producing a blow molded article having at least one dimension within a preselected range of the present invention. Injection mold 4 includes core 6 and mold splits 7 defining generally smooth injection mold interior surface 8, and may include thread splits 10 for forming a blow molded article having a threaded finish. Clamping members 12 may be provided to maintain core 6, mold splits 7, and thread splits 10 in relative position. Defined on injection mold interior surface 8 are a plurality of first differentially dimensioned portions 14. Each first differentially dimensioned portion 14 is disposed at a preselected location on injection mold interior surface 8. As is well known in the art, cooling passages 15 may be provided within injection mold 4 for more rapid cooling of molten polymeric resin. In addition, molten polymeric resin injection gate 16 is provided adjacent to mold splits 7, and cavity 17 is defined between core 6 and injection mold interior surface 8.

Figure 2:
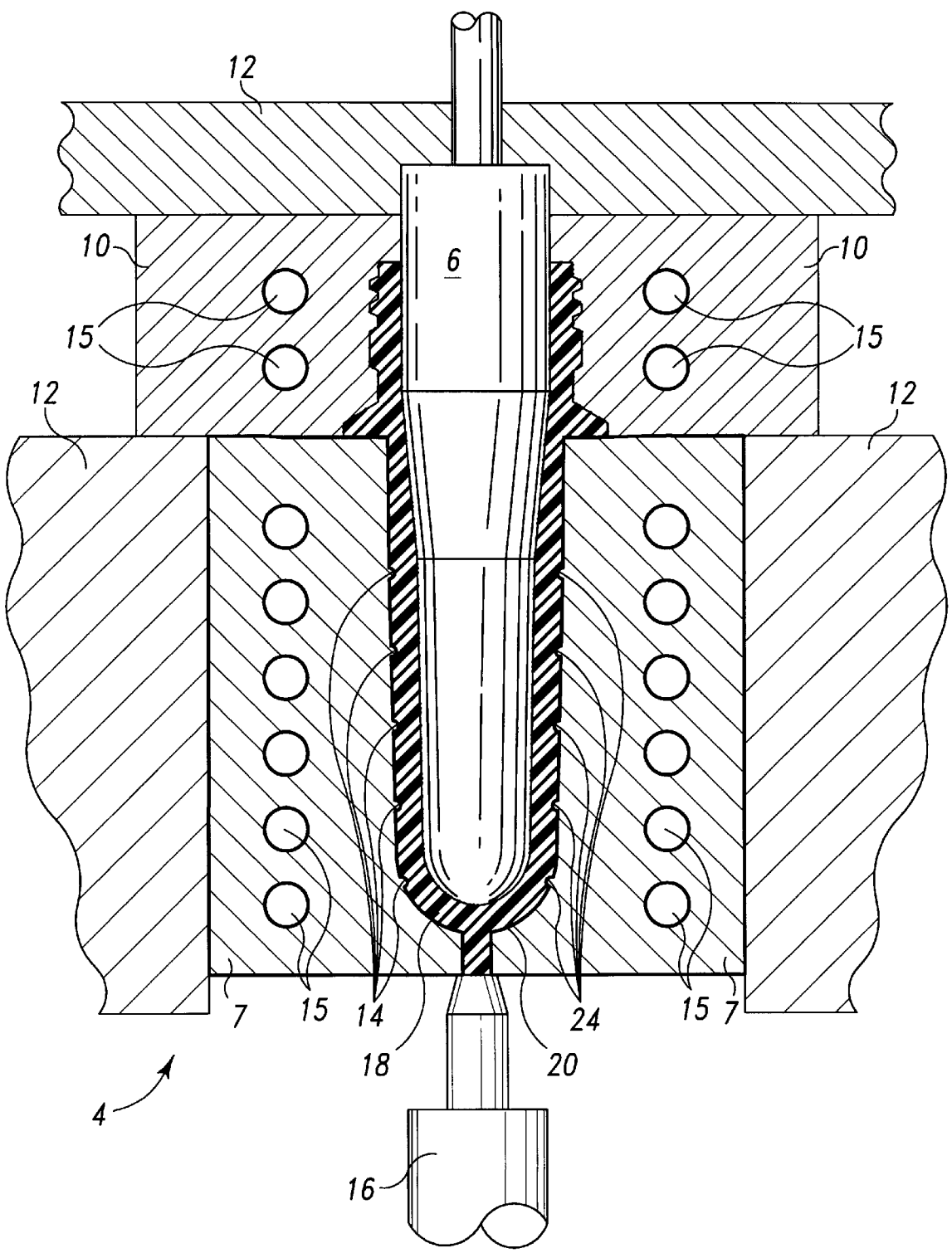
FIG. 2 is a sectional view of an injection mold of an apparatus for producing a stretch blow molded article having at least one dimension within a preselected range representing the present invention, depicted with a parison.

Referring to FIG. 2, by injection of molten polymeric resin through gate 16 into cavity 17 in the customary fashion, injection mold 4 is capable of producing parison 18. Parison exterior surface 20 defined by parison 18 includes a plurality of first markers 24, each first marker 24 formed by contact with one of first differentially dimensioned portions 14. In this way, each first marker 24 is formed at a preselected position on parison exterior surface 20.

First differentially dimensioned portions 14 are illustrated in FIG. 1 as relatively light circumferential lines, disposed as generally planar and disposed parallel to each other, with each first differentially dimensioned portion 14 forming a complete annulus on injection mold interior surface 8. However, it will be recognized that such depiction of first differentially dimensioned portions 14 is exemplary only, with the apparatus of the present invention contemplating first differentially dimensioned portions 14 disposed on injection mold interior surface 8 in any of a variety of configurations and orientations, such as where individual first differentially dimensioned portions 14 are formed of small or large differentially dimensioned segments disposed planarly or non-planarly, or such as incomplete and/or non-parallel annuli. In addition, first differentially dimensioned portions 14 may be formed by raised or depressed impressions on injection mold interior surface 8, or by modified surface finish of injection mold interior surface 8.

It will of course be recognized that parisons 18 may be formed using techniques other than that of injection molding already discussed. For instance, parisons 18 may be produced by transfer molding or by formation from extruded tubes, and may also include first markers 24 formed at preselected positions on parison exterior surface 20.

Figure 3:
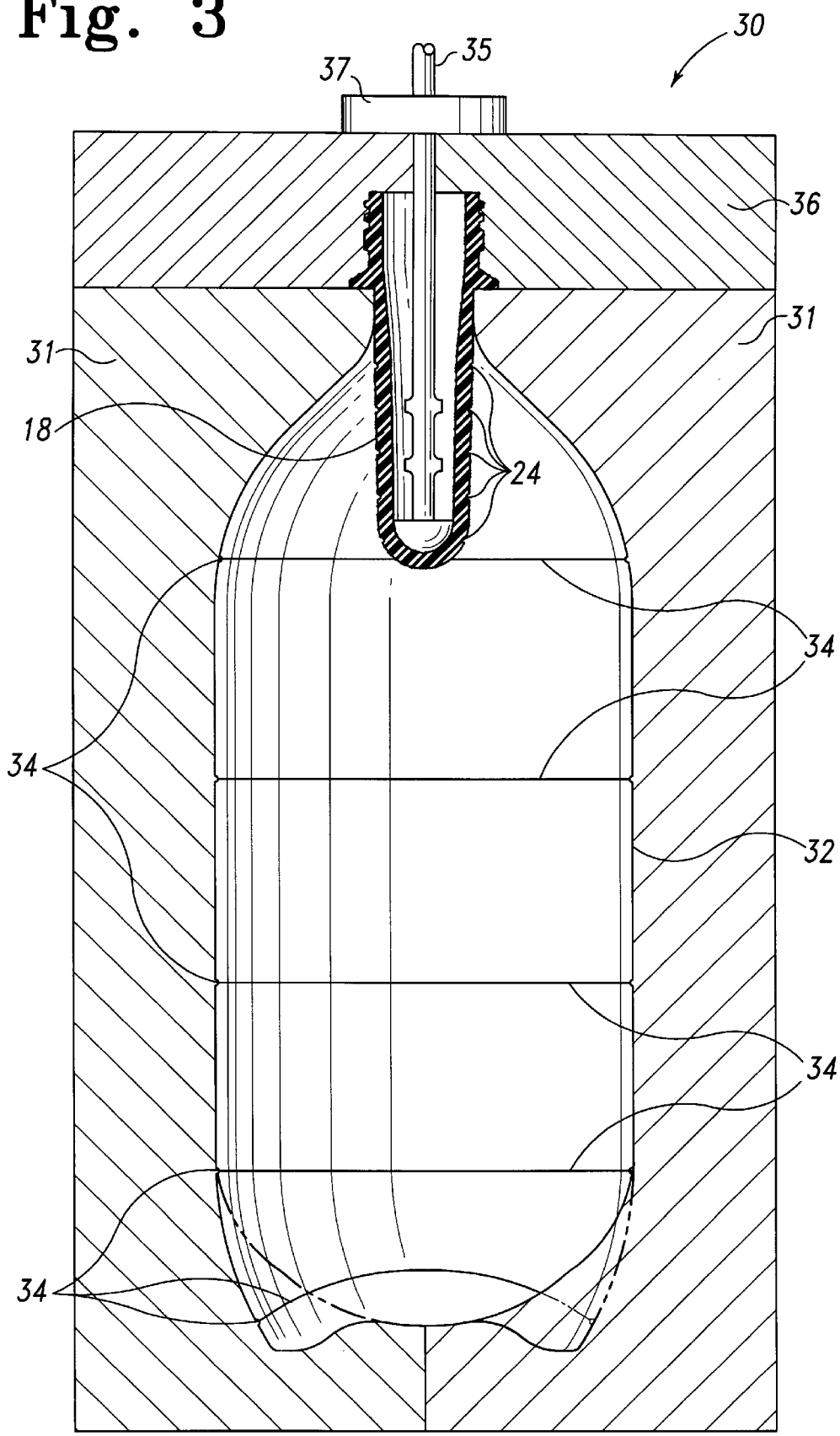
FIG. 3 is a sectional view of a stretch blow mold of an apparatus for producing a stretch blow molded article having at least one dimension within a preselected range representing the present invention, depicted with a parison prior to stretching and blowing.

Depicted in FIG. 3 is stretch blow mold 30 of an apparatus for producing a blow molded article having at least one dimension within a preselected range of the present invention. Stretch blow mold 30 includes stretch blow mold sections 31 defining generally smooth stretch blow mold interior surface 32 having a plurality of second differentially dimensioned portions 34. Each second differentially dimensioned portion 34 is disposed at a predetermined location on stretch blow mold interior surface 32, as will be described. Also as depicted in FIG. 3 is parison 18, previously formed by injection mold 4 as illustrated in FIGS. 1–2, before stretching and blowing.

Figure 4:
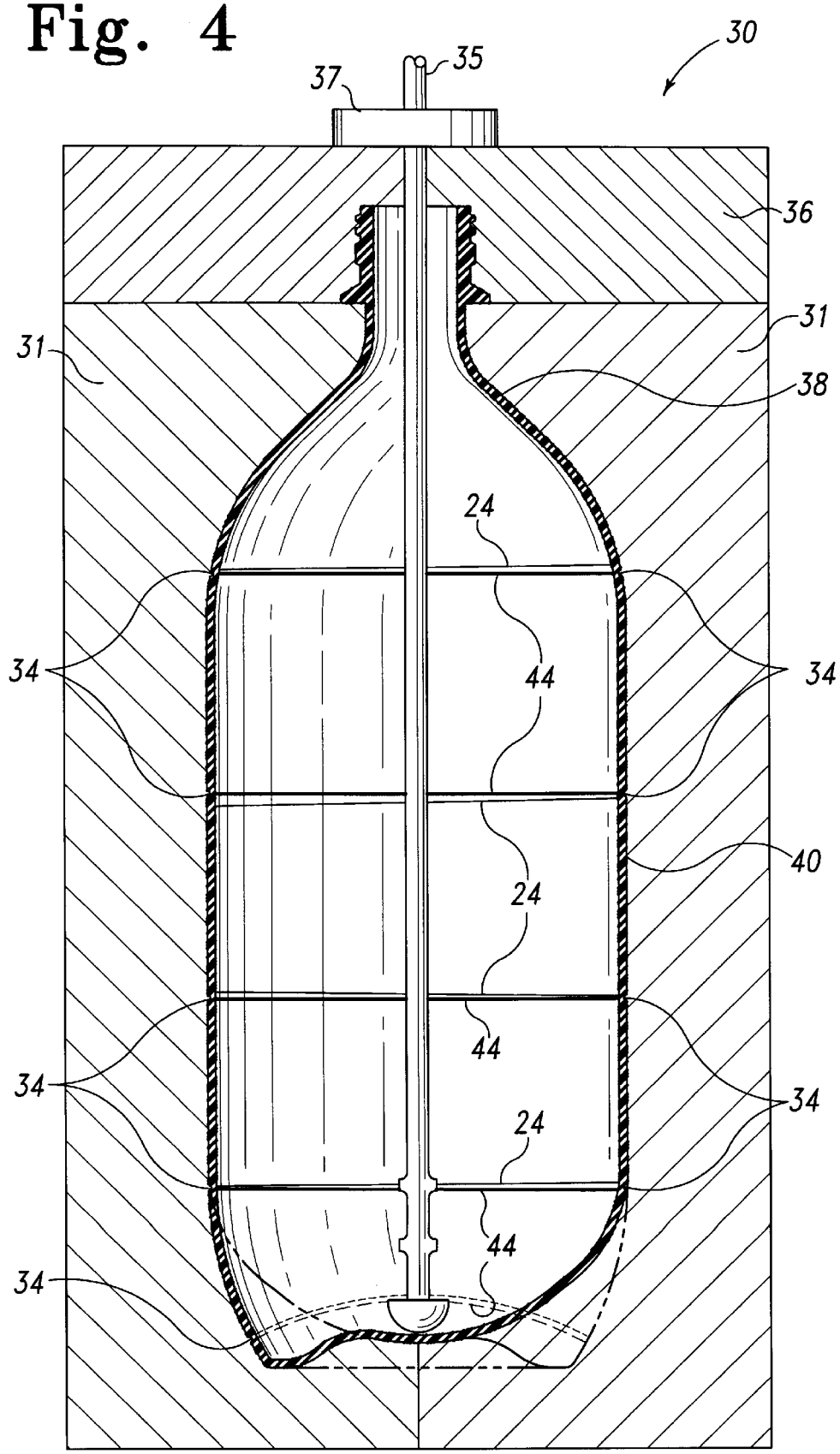
FIG. 4 is a sectional view of a stretch blow mold of an apparatus for producing a stretch blow molded article having at least one dimension within a preselected range representing the present invention, depicted with an article after stretching and blowing.

Utilizing stretching rod 35 slidably disposed through mold cap 36 and collar 37, stretch blow mold 30 is capable of producing an article 38 from parison 18 in the customary manner well known in the art, that is, by stretching and blow molding parison 18 to form article 38 as defined by stretch blow mold interior surface 32 shown in FIG. 4. Also, as shown in FIG. 4, article 38 may, for example, be formed of a transparent or translucent polymeric resin. During stretching and blowing, the dimensions of first markers 24 may change in absolute terms, however, first markers 24 remain present after stretching and blowing. In stretch blow molding, article exterior surface 40 defined by article 38 is formed to include a plurality of second markers 44 formed by contact with second differentially dimensioned portions 34. The shape and location of each second differentially dimensioned portion 34 may be selected to correspond with the optimum shape and location of one of stretched, blown first markers 24 disposed on article 38, after article 38 is blown from parison 18. In this way, each of second markers 44 may be disposed at a predetermined position on article exterior surface 40, corresponding with and proximate to one of first markers 24.

As shown in FIG. 3, each second differentially dimensioned portion 34 forms a complete annulus on stretch blow mold interior surface 32. However, as so illustrated, second differentially dimensioned portions 34 are exemplary only, with the apparatus of the present invention contemplating second differentially dimensioned portions 34 disposed on stretch blow mold interior surface 32 in any of a variety of configurations and orientations, such as where individual second differentially dimensioned portions 34 are formed of small or large differentially dimensioned segments disposed planarly or non-planarly, or such as incomplete annuli. Further, second differentially dimensioned portions 34 may be formed by raised or depressed impressions on stretch blow mold interior surface 34, or by modified surface finish of stretch blow mold interior surface 34.

Figure 5:
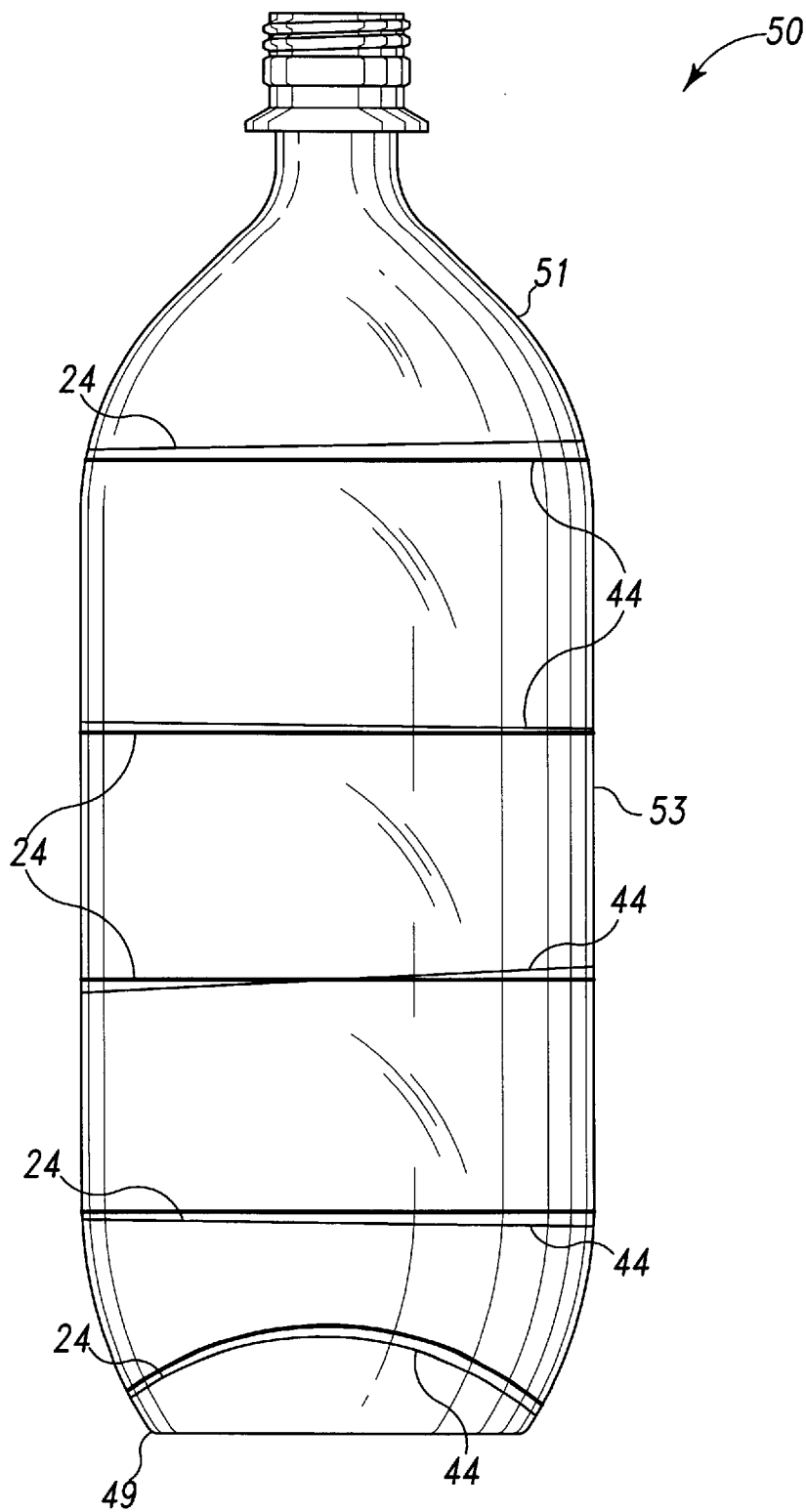
FIG. 5 is an elevational view of an article produced by an apparatus for producing a stretch blow molded article having at least one dimension within a preselected range of the present invention.

Illustrated in FIG. 5 is a finished article 38 in the form of transparent or translucent polymeric resin bottle 50 for containing liquids having a base 49 and a shoulder 51 joined together unitarily by a generally cylindrical label panel 53 for receiving a label (not shown), the bottle 50 including first markers 24 and second markers 44. The relative position of each first marker 24 with respect to a corresponding, proximately disposed second marker 44 indicates whether at least one dimension of article 38 is within the preselected range. For example, the dimension of thickness of a profile of bottle 50 may be determined to be within a preselected range of thicknesses by ascertaining whether the distance between each first marker 24 and a corresponding second marker 44 is less than a preselected distance.

Figure 6:
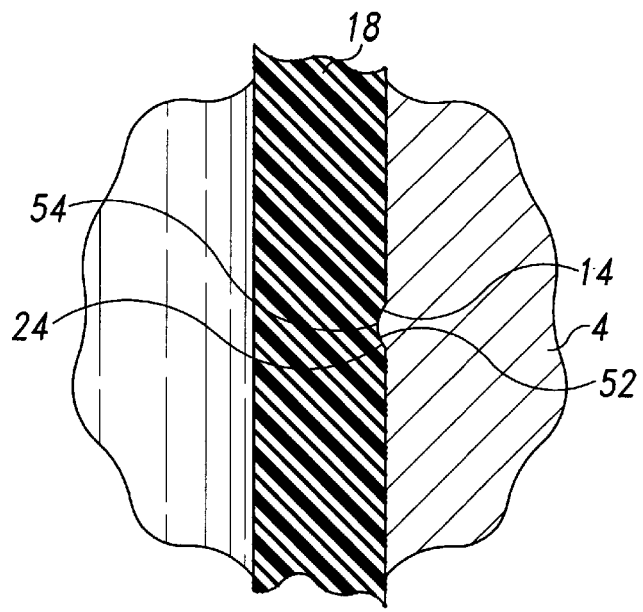
FIG. 6 is an enlarged partial sectional view of an injection mold of an apparatus for producing a stretch blow molded article having at least one dimension within a preselected range, representing a second embodiment of the present invention and depicted with a parison.

Referring now to FIG. 6, in a second embodiment of the apparatus of the present invention, injection mold 4 includes at least one first differentially dimensioned portion 14 having first raised portion 52. Due to the presence of first raised portion 52, injection mold 4 is capable of producing parison 18 with at least one first marker 24 including first indented portion 54, formed by contact of molten polymeric resin with first raised portion 52 during formation of parison 18.

Figure 7:
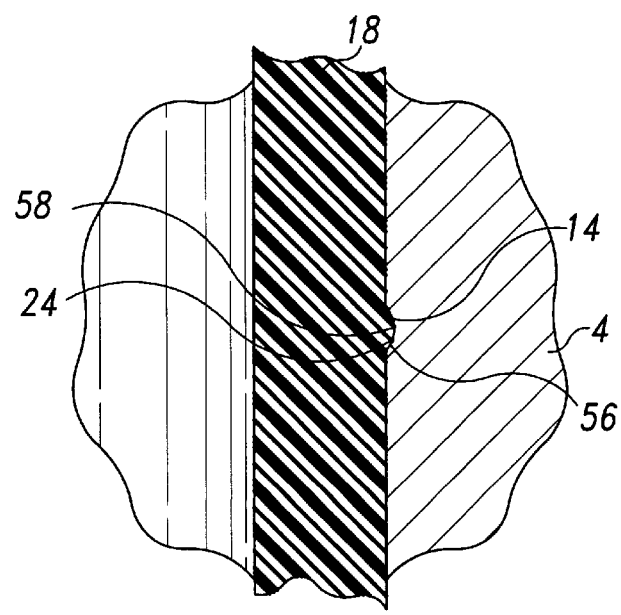
FIG. 7 is an enlarged partial sectional view of an injection mold of an apparatus for producing a stretch blow molded article having at least one dimension within a preselected range, representing a third embodiment of the present invention and depicted with a parison.

In a third embodiment of the apparatus of the present invention, depicted in FIG. 7, injection mold 4 includes at least one first differentially dimensioned portion 14 having second indented portion 56. As a result of the presence of second indented portion 56, injection mold 4 is capable of producing parison 18 with at least one first marker 24 including second raised portion 58, formed by contact of molten polymeric resin with second indented portion 56 during formation of parison 18.

Figure 8:
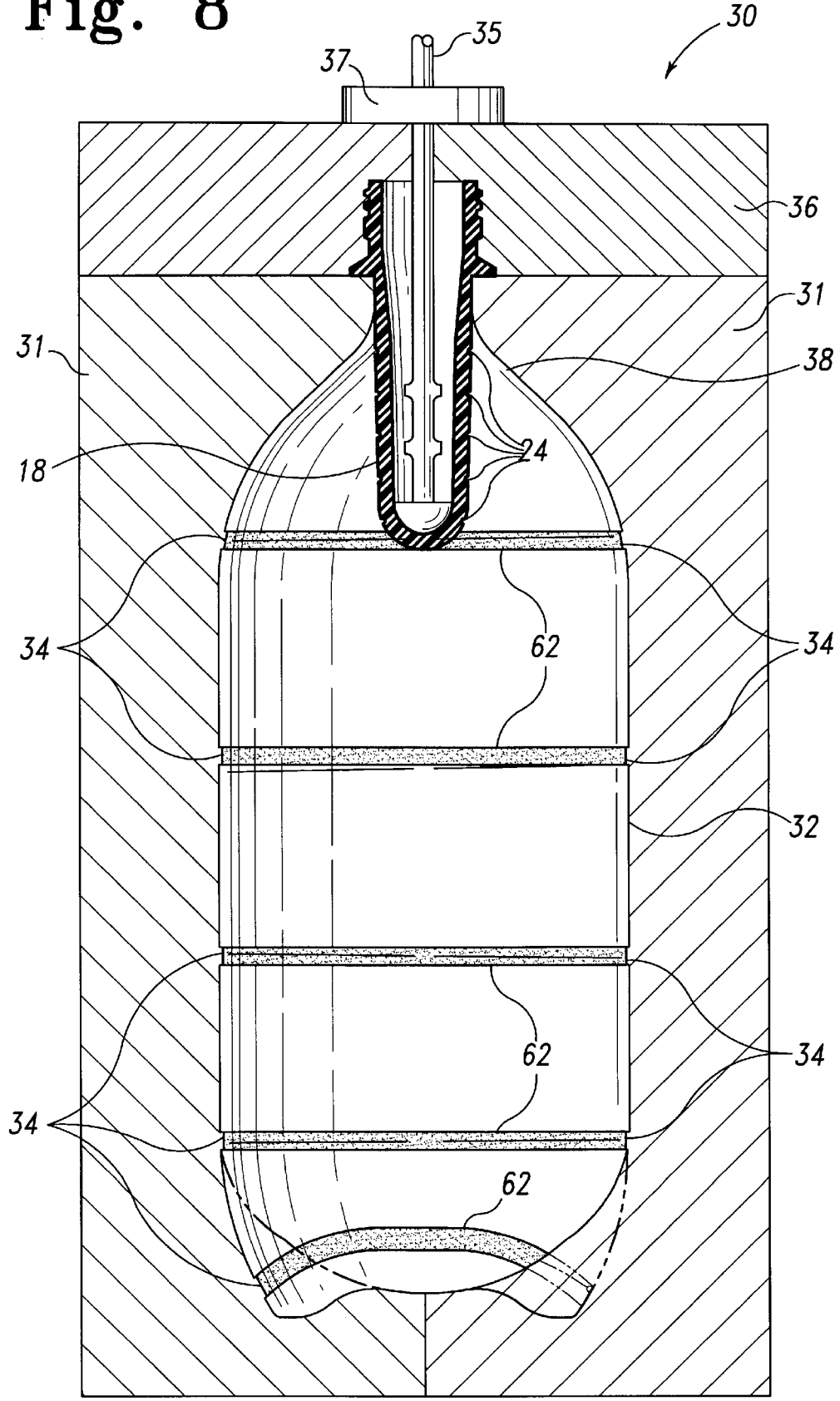
FIG. 8 is a sectional view of a stretch blow mold of an apparatus for producing a stretch blow molded article having at least one dimension within a preselected range representing a fourth embodiment of the present invention, depicted with a parison prior to stretching and blowing.
Figure 9:
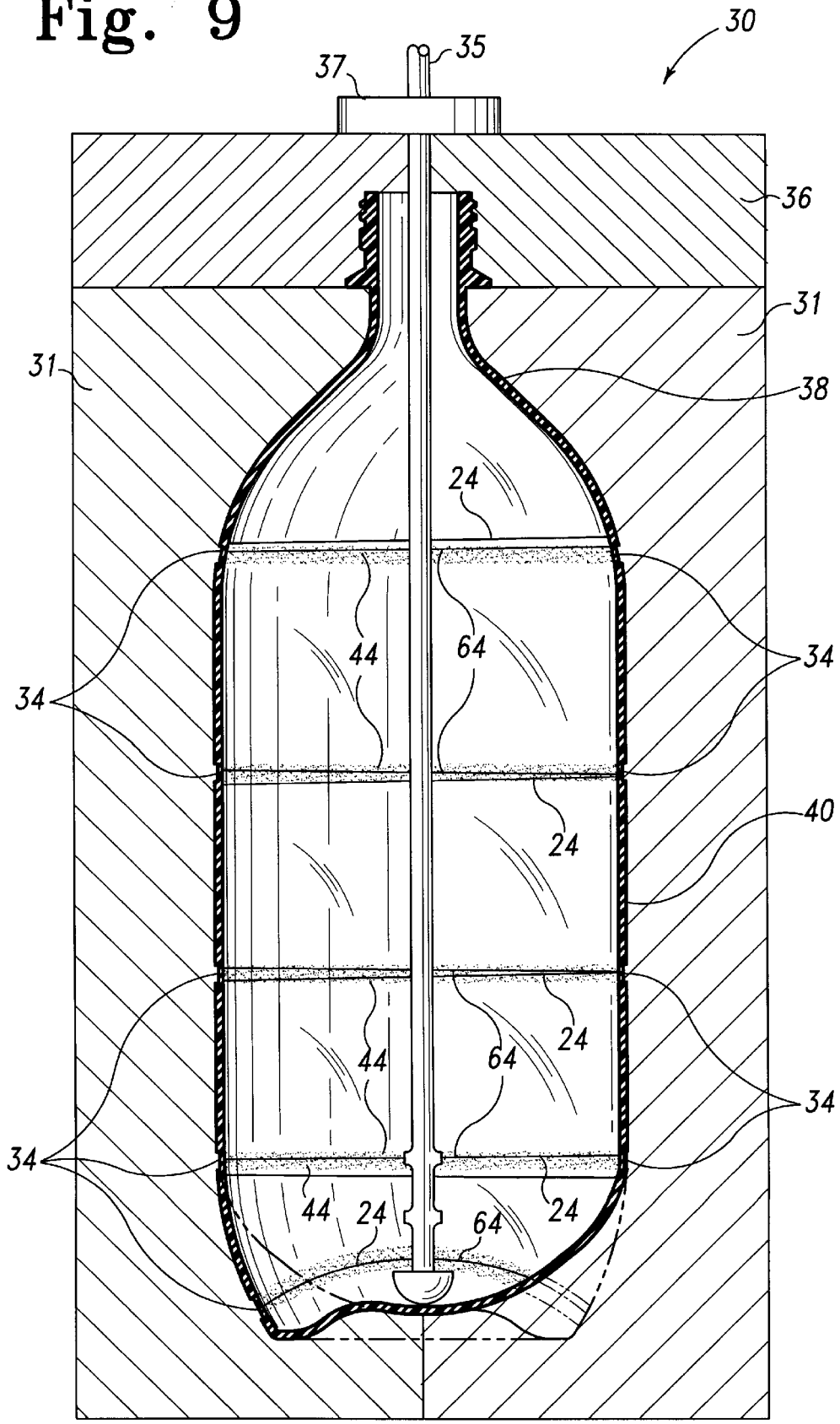
FIG. 9 is a sectional view of a stretch blow mold of an apparatus for producing a stretch blow molded article having at least one dimension within a preselected range representing a fourth embodiment of the present invention, depicted with an article after stretching and blowing.

As shown in FIGS. 8 and 9, in a fourth embodiment of the apparatus of the present invention, stretch blow mold 30 includes a plurality of second differentially dimensioned portions 34 having a tolerance band 62. Consequently, stretch blow mold 30 is capable of stretching and blowing parison 18 to produce article 38 having a plurality of second markers 44, each second marker 44 including a tolerance zone 64 formed by contact with a tolerance band 62 as parison 18 is blown into article 38.

Figure 10:
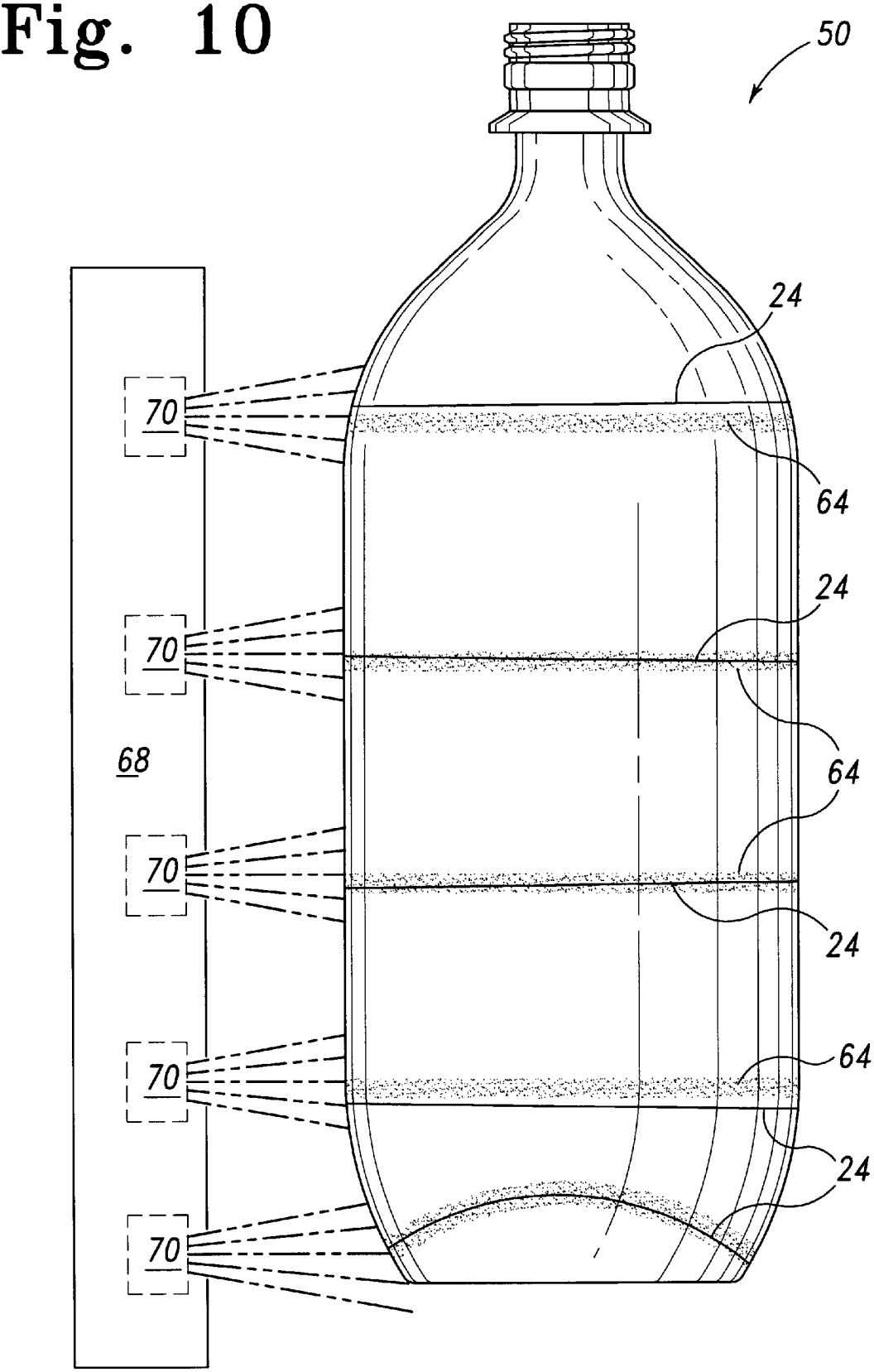
FIG. 10 is an elevational view of an article produced by an apparatus for producing a stretch blow molded article having at least one dimension within a preselected range representing a fourth embodiment of the apparatus of the present invention.

Depicted in FIG. 10 is a finished stretch blow molded article in the form of bottle 50 including a plurality of first markers 24 and a plurality of corresponding tolerance zones 64. The relative position of first markers 24 with respect to corresponding, proximate tolerance zones 64 indicates whether at least one dimension is within the preselected range. Where first markers 24 lie within corresponding tolerance zones 64, the at least one dimension will be within the preselected range. However, if a first marker 24 lies outside the corresponding tolerance zone 64, then the at least one dimension is not within the preselected range. For example, the dimension of thickness of the profile of bottle 50 may be determined to be within a preselected range of thicknesses by ascertaining whether each first marker 24 lies within the corresponding tolerance zone 64.

Inspection of articles 38 to determine whether first markers 24 are in acceptably close proximity to corresponding second markers 44, or to determine whether first markers 24 lie within corresponding tolerance zones 64 can be accomplished visually, by machine vision, or by other automated inspection procedures. For example, depicted in FIG. 10 is inspection means 68 capable of inspecting finished bottle 50, in order to determine whether first markers 24 lie within the corresponding tolerance zones 64. Inspection means 68 may include any of a number of available elements capable of automatic inspection, for instance, plurality of sensors 70 capable of sensing light transmitted through or reflected from bottle 50 proximate to first markers 24 and tolerance zones 64 with each sensor 70 capable of changing states upon receiving such transmitted or reflected light indicating that first markers 24 do not lie within one of tolerance zones 64.

Figure 11:
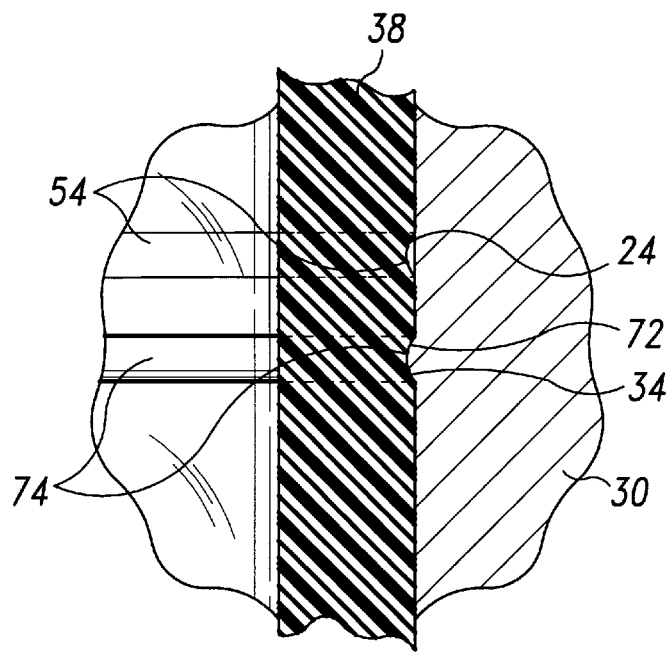
FIG. 11 is an enlarged partial sectional view of a stretch blow mold of an apparatus for producing a stretch blow molded article having at least one dimension within a preselected range representing a fifth embodiment of the present invention, depicted with a parison.

As shown in FIG. 11, in a fifth embodiment of the apparatus of the present invention, stretch blow mold 30 includes at least one second differentially dimensioned portion 34 including a first elevated portion 72. Consequently, stretch blow mold 30 is capable of producing article 38 with at least one second marker 44 including a first depressed portion 74, formed by contact with first elevated portion 72 as article 38 is stretched and blown. Also depicted in FIG. 11, article 38 has been stretched and blown from parison 18 produced from an injection mold 4 as illustrated in FIG. 6, with first marker 24 including first indented portion 54 formed by contact with a first raised portion 52 of injection mold 4 and subsequently stretched and possibly distorted as parison 18 was stretched and blown into article 38. In this way, relative position of first indented portion 54 with respect to first depressed portion 74 may be determined, indicating whether at least one dimension is within a preselected range.

Figure 12:
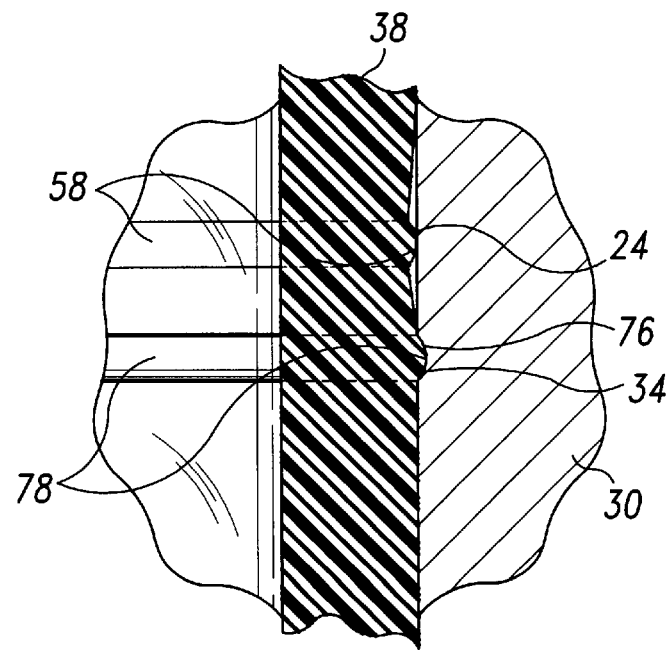
FIG. 12 is an enlarged partial sectional view of a stretch blow mold of an apparatus for producing a stretch blow molded article having at least one dimension within a preselected range representing a sixth embodiment of the present invention, depicted with a parison.

As depicted in FIG. 12, in a sixth embodiment of the apparatus of the present invention, stretch blow mold 30 includes at least one second differentially dimensioned portion 34 including a second depressed portion 76. Stretch blow mold 30 is therefore capable of producing article 38 with at least one second marker 44 including a second elevated portion 78, formed by contact with second depressed portion 76 as article 38 is stretched and blown. Also depicted in FIG. 14, article 38 has been stretched and blown from parison 18 produced from an injection mold 4 depicted in FIG. 7, with first marker 24 including second raised portion 58 formed by contact with a second indented portion 56 of injection mold 4. As a result, relative position of second raised portion 58 with respect to second elevated portion 78 is capable of indicating whether at least one dimension is within a preselected range.

Figure 13:
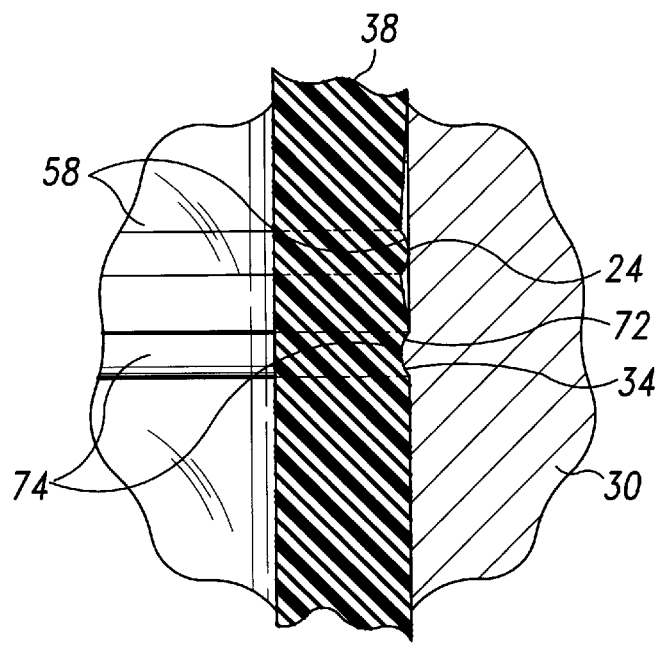
FIG. 13 is an enlarged partial sectional view of a stretch blow mold of an apparatus for producing a stretch blow molded article having at least one dimension within a preselected range representing a seventh embodiment of the present invention, depicted with a parison.

As shown in FIG. 13, in a seventh embodiment of the apparatus of the present invention, stretch blow mold 30 includes at least one second differentially dimensioned portion 34 including a first elevated portion 72. Hence, stretch blow mold 30 is capable of producing article 38 with at least one second marker 44 including a first depressed portion 74, formed by contact with first elevated portion 72 as article 38 is stretched and blown. Also illustrated in FIG. 13, article 38 has been stretched and blown from parison 18 produced from an injection mold 4 depicted in FIG. 7, with first marker 24 including second raised portion 58 formed by contact with second indented portion 56 of injection mold 4. As a result, relative position of second raised portion 58 with respect to first depressed portion 74 is capable of indicating whether at least one dimension is within a preselected range.

Figure 14:
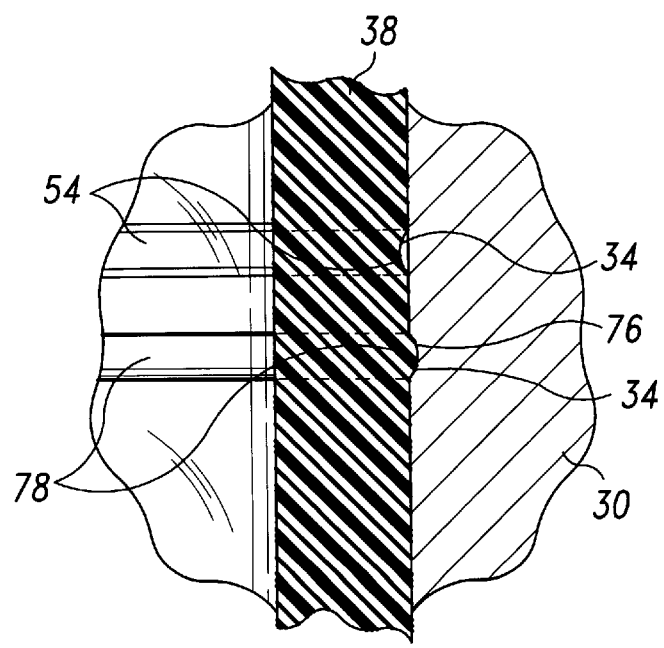
FIG. 14 is an enlarged partial sectional view of a stretch blow mold of an apparatus for producing a stretch blow molded article having at least one dimension within a preselected range representing an eighth embodiment of the present invention, depicted with a parison.

Illustrated in FIG. 14, in an eighth embodiment of the apparatus of the present invention, stretch blow mold 30 includes at least one second differentially dimensioned portion 34 including a second depressed portion 76. As a result, stretch blow mold 30 is capable of producing article 38 with at least one second marker 44 including a second elevated portion 78, formed by contact with second depressed portion 76. Also depicted in FIG. 12, article 38 has been produced from an injection mold 4 as illustrated in FIG. 6, with first marker 24 including a first indented portion 54 formed by contact with first raised portion 52 of injection mold 4. In this way, relative position of first indented portion 54 with respect to second elevated portion 78 may be determined, indicating whether at least one dimension is within a preselected range.

In use, locations of second differentially dimensioned portions 34 on stretch blow mold interior surface 32 may be determined as follows. During a preproduction phase of article development, optimum values for at least one dimension of article 38, such as material thickness distribution, is determined, and a set of optimum production parameters for stretch blow molding parisons 18 to form articles 38 achieving such at least one dimension are ascertained. A plurality of marker lines are made along parison exterior surface 20 of parison 18. The marker lines may be in the form of light, circumferential scores. Parison 18 is then stretch blown to form article 38, using the set of optimum parameters previously determined. As parison 18 is stretch blown by stretch blow mold 30 to form article 38, parison exterior surface 20 is stretched and distorted, and consequently the marker lines are also stretched and distorted. During stretch blow molding, the dimensions of the marker lines may change, including decreases in absolute terms as measured normal to parison exterior surface 20 or article exterior surface 40, however, the marker lines remain present on article exterior surface 40 after stretch blow molding. The marker lines are thus tracked to locations on article exterior surface 40, thereby providing a mapping between the marker lines on parison exterior surface 24 and optimum locations of the marker lines on article exterior surface 40 after the marker lines are stretched and distorted due to stretch blow molding of parison 18 using optimum production parameters. Optimum locations of stretched, distorted the marker lines on article exterior surface 40 are then be used to determine desired locations of second differentially dimensioned portions 34 on stretch blow mold interior surface 32 which would produce second markers 44 on article exterior surface 40 corresponding with, matching, and overlying the optimum locations of stretched, distorted the marker lines on article exterior surface 40. In other words, optimum locations of the marker lines are tracked from parison exterior surface 20 to article exterior surface 40 and then to stretch blow mold interior surface 32 to determine the locations of second differentially dimensioned portions 34.

Locations of tolerance bands 62 on stretch blow mold interior surface 32 may be determined as follows. During preproduction phase of article development, a small variation or perturbation from the at least one optimum dimension of article 38, for example, optimum material thickness distribution, may be introduced by slightly varying or detuning the set of optimum production parameters for stretch blow molding a parison 18 having the marker lines disposed at the optimum locations on parison exterior surface 20. As a result, an article 38 that is stretch blow molded using production parameters slightly detuned from optimum will have marker lines stretched and distorted to locations on article exterior surface 40 that are slightly different from the locations of marker lines on article exterior surface 40 resulting from stretch blow molding using the optimum set of stretch blow molding production parameters. By repeating this procedure, each time slightly varying different production parameters, allowable tolerances for values of the at least one dimension of article 38 may be tracked to a plurality of acceptable locations for each stretched and distorted first marker 24 on article exterior surface 40. By considering the set of acceptable locations of each stretched and distorted first marker 24 on article exterior surface 40 as defining a range of acceptable tolerance for values of the at least one dimension allowable for article 38, such ranges of acceptable tolerance may be mapped to stretch blow mold interior surface 32 to define, for each second differentially dimensioned portion 34, a tolerance band 62 located to correspond with each range of acceptable tolerance. The second differentially dimensioned portions 34 are capable of producing second markers 44 on article exterior surface 32 including tolerance zones 64 matching the ranges of acceptable tolerance.

On production injection molds 4, injection mold interior surface 8 is formed to have first differential dimensioned portions 14 capable of producing parisons including first markers 24 in the same locations as the marker lines scribed on parison exterior surface 20 during the preproduction phase as described above. Further, on production stretch blow molds 30, stretch blow mold interior surface 32 is formed to have second differentially dimensioned portions 34 capable of producing articles 38 including second markers 44 on article exterior surface 40 corresponding to the optimum locations of stretched, distorted first markers 24.

As described and illustrated, the apparatus of the present invention provides for the production of stretch blow molded articles with non-destructively and directly controlled dimensions, for example material thickness distribution throughout the profile of stretch blow molded articles, thereby providing consistent quality control across platforms and production facilities, and ensuring that the an optimum article is consistently produced. Consistent and controlled physical dimensions for stretch blow molded articles provided by the present invention positively affects performance characteristics of stretch blow molded articles including burst strength, deformation, and stress cracking.

The method of the present invention for producing a stretch blow molded article having at least one dimension within a preselected range includes the step of injection molding parison 18 so that parison exterior surface 20 includes at least one first marker 24, each first marker disposed at a preselected position on parison exterior surface 20 and formed by contact with a first differentially dimensioned portion 14 disposed at a preselected location on generally smooth injection mold interior surface 8 defined by injection mold 4. Further, the method of the present invention includes the step of stretch blow molding article 38 from parison 18 so that article exterior surface 40 includes at least one second marker 44, each second marker disposed at a predetermined position on article exterior surface 40 and formed by contact with a second differentially dimensioned portion 34 disposed at a predetermined location on generally smooth stretch blow mold interior surface 32 defined by stretch blow mold 30, whereby relative position of first markers 24 with respect to second markers 44 indicating whether at least one dimension is within a preselected range.

The method of the present invention may also include stretch blow molding article 38 so that at least one second marker 44 includes a tolerance zone 64 formed by contact with a tolerance band 62 defined by second differentially dimensioned portion 34, whereby relative position of a first marker 24 within tolerance zone 64 indicates that at least one dimension is within a preselected range. In addition, the method of the present invention may also include inspecting article 38 to determine whether first marker 24 is positioned within tolerance zone 64.

Further, in the method of the present invention, parison 18 may be injection molded so that a first marker 24 includes first indented portion 54 formed by contact with first raised portion 52 defined by first differentially dimensioned portion 14. In addition, article 38 may be stretch blow molded so that a second marker 44 includes first depressed portion 74 formed by contact with first elevated portion 72 defined by second differentially dimensioned portion 34, whereby relative position of first indented portion 54 with respect to first depressed portion 74 indicates whether a dimension is within a preselected range.

Additionally, the method of the present invention may include injection molding parison 18 so that a first marker 24 includes second raised portion 58 formed by contact with second indented portion 56 defined by first differentially dimensioned portion 14, and stretch blow molding article 38 so that a second marker 44 includes second elevated portion 78 formed by contact with second depressed portion 76 defined by second differentially dimensioned portion 34. In this way, relative position of second raised portion 58 with respect to second elevated portion 78 indicates whether a dimension is within a preselected range.

The method of the present invention may also include injection molding parison 18 so that a first marker 24 includes second raised portion 58 formed by contact with second indented portion 56 defined by first differentially dimensioned portion 14, and stretch blow molding article 38 so that a second marker 44 includes first depressed portion 74 formed by contact with first elevated portion 72 defined by second differentially dimensioned portion 34, whereby relative position of second raised portion 58 with respect to first depressed portion 74 indicates whether a dimension is within a preselected range.

Similarly, in the method of the present invention, parison 18 may be injection molded so that a first marker 24 includes first indented portion 54 formed by contact with first raised portion 52 defined by first differentially dimensioned portion 14. In addition, article 38 may be stretch blow molded so that a second marker 44 includes second elevated portion 78 formed by contact with second depressed portion 76 defined by second differentially dimensioned portion 34, whereby relative position of first indented portion 54 with respect to second elevated portion 78 indicates whether a dimension is within a preselected range.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. A method for producing a stretch blow molded article having a dimension within a preselected range from a parison defining a parison exterior surface including a first marker disposed at a preselected position on the parison exterior surface, comprising the steps of:

provinding a stretch blow mold defining a stretch blow mold interior surface having an elevated portion disposed at a predetermined location thereon; and stretch blow molding the article from the parison so that an article exterior surface defined by the article includes a second marker disposed at a predetermined position on the article exterior surface and formed by contact with the elevated portion, whereby relative position of the first marker with respect to the second marker indicates whether the dimension is within the preselected range.

2. A method for producing a stretch blow molded article according to claim 1, wherein the step of providing the stretch blow mold includes providing a tolerance band defined by the elevated portion, and the step of stretch blow molding includes molding the article so that the second marker includes a tolerance zone formed by contact with the tolerance band, whereby relative position of the first marker within the tolerance zone indicates that the dimension is within the preselected range.

3. A method for producing a stretch blow molded article having a dimension within a preselected range from a parison defining a parison exterior surface including a first marker disposed at a preselected position on the parison exterior surface, comprising the steps of:

providing a stretch blow mold defining a stretch blow mold interior surface having a depressed portion disposed at a predetermined location thereon; and stretch blow molding the article from the parison so that an article exterior surface defined by the article includes a second marker disposed at a predetermined position on the article exterior surface and formed by contact with the depressed portion, whereby relative position of the first marker with respect to the second marker indicates whether the dimension is within the preselected range.

4. A method for producing a stretch blow molded article according to claim 3, wherein the step of providing the stretch blow mold includes providing a tolerance band defined by the depressed portion, and the step of stretch blow molding includes molding the article so that the second marker includes a tolerance zone formed by contact with the tolerance band, whereby relative position of the first marker within the tolerance zone indicates that the dimension is within the preselected range.

5. A method for producing a stretch blow molded article having a dimension within a preselected range from a parison defining a parison exterior surface including a first marker disposed at a preselected position on the parison exterior surface, comprising the steps of:

providing a stretch blow mold defining a stretch blow mold interior surface having a modified surface finish portion disposed at a predetermined location thereon; and stretch blow molding the article from the parison so that an article exterior surface defined by the article includes a second marker disposed at a predetermined position on the article exterior surface and formed by contact with the modified surface finish portion, whereby relative position of the first marker with respect to the second marker indicates whether the dimension is within the preselected range.

6. A method for producing a stretch blow molded article according to claim 5, wherein the step of providing the stretch blow mold includes providing a tolerance band defined by the modified surface finish portion, and the step of stretch blow molding includes molding the article so that the second marker includes a tolerance zone formed by contact with the tolerance band, whereby relative position of the first marker within the tolerance zone indicates that the dimension is within the preselected range.

7. A method for producing a stretch blow molded article having a dimension within a preselected range, comprising:

injection molding a parison so that a parison exterior surface defined by the parison includes a first marker disposed at a preselected position on the parison exterior surface and formed by contact with a raised portion disposed at a preselected location on an injection mold interior surface defined by an injection mold; and stretch blow molding the article from the parison so that an article exterior surface defined by the article includes a second marker disposed at a predetermined position on the article exterior surface and formed by contact with an elevated portion disposed at a predetermined location on a stretch blow mold interior surface defined by a stretch blow mold, whereby relative position of the first marker with respect to the second marker indicates whether the dimension is within the preselected range.

8. A method for producing a stretch blow molded article according to claim 7, wherein the article is stretch blow molded so that the second marker includes a tolerance zone formed by contact with a tolerance band defined by the elevated portion, whereby relative position of the first marker within the tolerance zone indicates that the dimension is within the preselected range.

9. A method for producing a stretch blow molded article having a dimension within a preselected range, comprising:

injection molding a parison so that a parison exterior surface defined by the parison includes a first marker disposed at a preselected position on the parison exterior surface and formed by contact with an indented portion disposed at a preselected location on an injection mold interior surface defined by an injection mold; and stretch blow molding the article from the parison so that an article exterior surface defined by the article includes a second marker disposed at a predetermined position on the article exterior surface and formed by contact with a depressed portion disposed at a predetermined location on a stretch blow mold interior surface defined by a stretch blow mold, whereby relative position of the first marker with respect to the second marker indicates whether the dimension is within the preselected range.

10. A method for producing a stretch blow molded article according to claim 9, wherein the article is stretch blow molded so that the second marker includes a tolerance zone formed by contact with a tolerance band defined by the depressed portion, whereby relative position of the first marker within the tolerance zone indicates that the dimension is within the preselected range.

11. A method for producing a stretch blow molded article having a dimension within a preselected range, comprising:

injection molding a parison so that a parison exterior surface defined by the parison includes a first marker disposed at a preselected position on the parison exterior surface and formed by contact with a raised portion disposed at a preselected location on an injection mold interior surface defined by an injection mold; and stretch blow molding the article from the parison so that an article exterior surface defined by the article includes a second marker disposed at a predetermined position on the article exterior surface and formed by contact with a depressed portion disposed at a predetermined location on a stretch blow mold interior surface defined by a stretch blow mold, whereby relative position of the first marker with respect to the second marker indicates whether the dimension is within the preselected range.

12. A method for producing a stretch blow molded article according to claim 11, wherein the article is stretch blow molded so that the second marker includes a tolerance zone formed by contact with a tolerance band defined by the depressed portion, whereby relative position of the first marker within the tolerance zone indicates that the dimension is within the preselected range.

13. A method for producing a stretch blow molded article having a dimension within a preselected range, comprising:

injection molding a parison so that a parison exterior surface defined by the parison includes a first marker disposed at a preselected position on the parison exterior surface and formed by contact with an indented portion disposed at a preselected location on an injection mold interior surface defined by an injection mold; and stretch blow molding the article from the parison so that an article exterior surface defined by the article includes a second marker disposed at a predetermined position on the article exterior surface and formed by contact with an elevated portion disposed at a predetermined location on a stretch blow mold interior surface defined by a stretch blow mold, whereby relative position of the first marker with respect to the second marker indicates whether the dimension is within the preselected range.

14. A method for producing a stretch blow molded article according to claim 13, wherein the article is stretch blow molded so that the second marker includes a tolerance zone formed by contact with a tolerance band defined by the elevated portion, whereby relative position of the first marker within the tolerance zone indicates that the dimension is within the preselected range.

15. A method for producing a stretch blow molded article having a dimension within a preselected range, comprising:

injection molding a parison so that a parison exterior surface defined by the parison includes a first marker disposed at a preselected position on the parison exterior surface and formed by contact with a modified surface finish portion disposed at a preselected location on an injection mold interior surface defined by an injection mold; and stretch blow molding the article from the parison so that an article exterior surface defined by the article includes a second marker disposed at a predetermined position on the article exterior surface and formed by contact with an elevated portion disposed at a predetermined location on a stretch blow mold interior surface defined by a stretch blow mold, whereby relative position of the first marker with respect to the second marker indicates whether the dimension is within the preselected range.

16. A method for producing a stretch blow molded article according to claim 15, wherein the article is stretch blow molded so that the second marker includes a tolerance zone formed by contact with a tolerance band defined by the elevated portion, whereby relative position of the first marker within the tolerance zone indicates that the dimension is within the preselected range.

17. A method for producing a stretch blow molded article having a dimension within a preselected range, comprising:

injection molding a parison so that a parison exterior surface defined by the parison includes a first marker disposed at a preselected position on the parison exterior surface and formed by contact with a modified surface finish portion disposed at a preselected location on an injection mold interior surface defined by an injection mold; and stretch blow molding the article from the parison so that an article exterior surface defined by the article includes a second marker disposed at a predetermined position on the article exterior surface and formed by contact with a depressed portion disposed at a predetermined location on a stretch blow mold interior surface defined by a stretch blow mold, whereby relative position of the first marker with respect to the second marker indicates whether the dimension is within the preselected range.

18. A method for producing a stretch blow molded article according to claim 17, wherein the article is stretch blow molded so that the second marker includes a tolerance zone formed by contact with a tolerance band defined by the depressed portion, whereby relative position of the first marker within the tolerance zone indicates that the dimension is within the preselected range.

19. A method for producing a stretch blow molded article having a dimension within a preselected range, comprising:

injection molding a parison so that a parison exterior surface defined by the parison includes a first marker disposed at a preselected position on the parison exterior surface and formed by contact with a raised portion disposed at a preselected location on an injection mold interior surface defined by an injection mold; and stretch blow molding the article from the parison so that an article exterior surface defined by the article includes a second marker disposed at a predetermined position on the article exterior surface and formed by contact with a modified surface finish portion disposed at a predetermined location on a stretch blow mold interior surface defined by a stretch blow mold, whereby relative position of the first marker with respect to the second marker indicates whether the dimension is within the preselected range.

20. A method for producing a stretch blow molded article according to claim 19, wherein the article is stretch blow molded so that the second marker includes a tolerance zone formed by contact with a tolerance band defined by the modified surface finish portion, whereby relative position of the first marker within the tolerance zone indicates that the dimension is within the preselected range.

21. A method for producing a stretch blow molded article having a dimension within a preselected range, comprising:

injection molding a parison so that a parison exterior surface defined by the parison includes a first marker disposed at a preselected position on the parison exterior surface and formed by contact with an indented portion disposed at a preselected location on an injection mold interior surface defined by an injection mold; and stretch blow molding the article from the parison so that an article exterior surface defined by the article includes a second marker disposed at a predetermined position on the article exterior surface and formed by contact with a modified surface finish portion disposed at a predetermined location on a stretch blow mold interior surface defined by a stretch blow mold, whereby relative position of the first marker with respect to the second marker indicates whether the dimension is within the preselected range.

22. A method for producing a stretch blow molded article according to claim 21, wherein the article is stretch blow molded so that the second marker includes a tolerance zone formed by contact with a tolerance band defined by the modified surface finish portion, whereby relative position of the first marker within the tolerance zone indicates that the dimension is within the preselected range.

23. A method for producing a stretch blow molded article having a dimension within a preselected range, comprising:

injection molding a parison so that a parison exterior surface defined by the parison includes a first marker disposed at a preselected position on the parison exterior surface and formed by contact with a first modified surface finish portion disposed at a preselected location on an injection mold interior surface defined by an injection mold; and stretch blow molding the article from the parison so that an article exterior surface defined by the article includes a second marker disposed at a predetermined position on the article exterior surface and formed by contact with a second modified surface finish portion disposed at a predetermined location on a stretch blow mold interior surface defined by a stretch blow mold, whereby relative position of the first marker with respect to the second marker indicates whether the dimension is within the preselected range.

24. A method for producing a stretch blow molded article according to claim 23, wherein the article is stretch blow molded so that the second marker includes a tolerance zone formed by contact with a tolerance band defined by the second modified surface finish portion, whereby relative position of the first marker within the tolerance zone indicates that the dimension is within the preselected range.

* * * * *